United States Patent [19]

Nicolet et al.

[11] 4,162,239

[45] Jul. 24, 1979

[54] PROCESS FOR THE PRODUCTION OF TRANSPARENT POLYMERS OF VINYL CHLORIDE WITH VERY HIGH IMPACT STRENGTH

[75] Inventors: René Nicolet, Fribourg; Robert Schierer, Dudingen, both of Switzerland

[73] Assignee: Lonza Ltd., Gampel, Valais, Switzerland

[21] Appl. No.: 718,165

[22] Filed: Aug. 27, 1976

Related U.S. Application Data

[63] Continuation of Ser. No. 530,374, Dec. 6, 1974, abandoned.

[30] Foreign Application Priority Data

Nov. 14, 1974 [CH] Switzerland ......................... 15185/74

[51] Int. Cl.² ................................................ C08L 27/06
[52] U.S. Cl. ........................ 260/29.7 UP; 260/23 AR; 260/23 XA; 260/23 EM; 260/29.7 UA; 525/281; 525/287; 525/301; 525/305; 525/306; 525/307
[58] Field of Search ................ 260/29.6 RB, 884, 885, 260/23 AR, 23 XA, 23 EM, 29.7 UA, 29.7 UP

[56] References Cited

U.S. PATENT DOCUMENTS

| | | | |
|---|---|---|---|
| 3,334,156 | 8/1967 | Calentine et al. | 260/884 |
| 3,426,101 | 2/1969 | Ryan et al. | 260/876 R |
| 3,655,825 | 4/1972 | Souder et al. | 260/885 |
| 3,776,982 | 12/1973 | Nicolet et al. | 260/885 |
| 3,832,318 | 8/1974 | Gallagher et al. | 260/29.7 UP |
| 4,014,842 | 3/1977 | Kosugi et al. | 260/29.6 RB |

*Primary Examiner*—Harold D. Anderson
*Attorney, Agent, or Firm*—Fisher, Christen & Sabol

[57] ABSTRACT

Process for the preparation of a transparent, weather-resistant vinyl chloride polymer having a very high impact strength by the polymerization of vinyl chloride either together with or without other copolymerizable monomers in aqueous dispersion by the emulsion polymerization method in the presence of at least one acrylic ester copolymer. The process involves emulsion polymerizing vinyl chloride or a monomer mixture containing at least 80 percent by weight of vinyl chloride in the presence of a dispersion of at least one acrylic ester copolymer consisting of 90 to 99.7 percent by weight of at least one acrylic ester containing 3 to 16 carbon atoms in the ester group and 0.3 to 10 percent by weight of a polyfunctional monomer having at least two nonconjugated ethylenic double bonds, at least one of said double bonds being of the allyl type. The acrylic ester copolymer having a mean particle diameter of 30 to 150 nm, determined by soap titration. The acrylic ester copolymer is used in a quantity such that the resultant vinyl polymer contains 4 to 20 percent by weight of acrylic ester units.

18 Claims, 2 Drawing Figures

PROCESS FOR THE PRODUCTION OF TRANSPARENT POLYMERS OF VINYL CHLORIDE WITH VERY HIGH IMPACT STRENGTH

This is a continuation of application Ser. No. 530,374, filed on Dec. 6, 1974 now abandoned.

BACKGROUND OF THIS INVENTION

1. Field of This Invention

This invention relates to a process for the preparation of transparent and weather-resistant vinyl chloride polymers having high impact strength by the polymerization of vinyl chloride either together with or without other copolymerizable monomers in aqueous dispersion by the emulsion polymerization method in the presence of acrylic ester copolymers (copolymerizates).

2. Prior Art

Belgian Pat. No. 770,011 discloses producing vinyl chloride polymers by the polymerization of vinyl chloride by the emulsion polymerization method in the presence of 2 to 10 percent by weight of a 2-ethyl hexyl acrylate polymer. In comparison with the products produced by previous prior art, these prior art products have increased impact strength and better transparency. These prior art products are suitable for the production of translucent products, but they have too much haze (as defined hereinafter) for use for transparent application. If higher transparency is required, the concentration of the 2-ethyl hexyl acrylate pre-polymer can be reduced or the diameter of the poly-2-ethyl hexyl acrylate particles can be reduced. Both these steps, however, reduce the impact strength.

See U.S. Pat. Nos. 2,894,950, 3,041,308, 3,041,309, 3,334,156, 3,426,101, 3,655,825, 3,692,871, 3,770,851 and 3,776,982. Also see Schildnecht, Calvin E., "Allyl Compounds and Their Polymers", Wiley Interscience, N.Y., (1973), pp. 602–603.

BROAD DESCRIPTION OF THIS INVENTION

An object of this invention is to provide a process for the production of vinyl chloride polymers which have very high impact strength, have good resistance to climatic conditions and are transparent or substantially transparent.

Other objects and advantages will be obvious to one ordinarily skilled in the art.

The objects and advantages of this invention are achieved by the process and product of this invention.

It has now been found that weather resistant or proof polymers of vinyl chloride, which also have very high impact strength and are transparent to substantially transparent, are obtained if the pre-polymer used is a copolymer of acrylic ester with a polyfunctional monomer having at least two non-conjugated ethylenic double bonds, at least one of the double bonds being of the allyl type.

The process according to this invention is characterized in that vinyl chloride or monomer mixture containing at least 80 percent by weight of vinyl chloride is polymerized in the presence of a dispersion of at least one (acrylic ester) copolymer consisting of 90 to 99.7 percent by weight of at least one acrylic ester containing 3 to 16 carbon atoms in the ester group, and 0.3 to 10 percent by weight of a polyfunctional monomer having at least two non-conjugated ethylenic double bonds, at one of such double bonds being of the allyl type. The acrylic ester copolymer has a mean particle diameter of 30 to 150 nm, preferably 40 to 120 nm, determined by soap titration. The acrylic ester copolymer is used in a quantity such that the end polymer contains 4 to 20 percent by weight of acrylic ester units.

The acrylic ester copolymers preferably consist of 95 to 99.5 percent by weight of at least one acrylic ester having 3 to 16 carbon atoms, advantageously 4 to 8 carbon atoms, in the ester group and 0.5 to 5 especially 1.0 to 2.4 percent by weight of a polyfunctional monomer having at least two non-conjugated ethylenic double bonds, at least one of such double bonds being allyl or of the allyl type.

This invention also includes the product defined herein.

An acrylic ester copolymer having from 55 to 95 percent by weight of acrylic acid ester and 35 to 5 percent by weight of α-methylstyrene can be used as a pre-polymer during the emulsion polymerization of vinyl chloride. As a result of such the transparency of the copolymer is improved, but a high impact strength is obtained only when large quantities of the acrylic ester copolymer is used.

DETAILED DESCRIPTION OF THIS INVENTION

Figure 1:
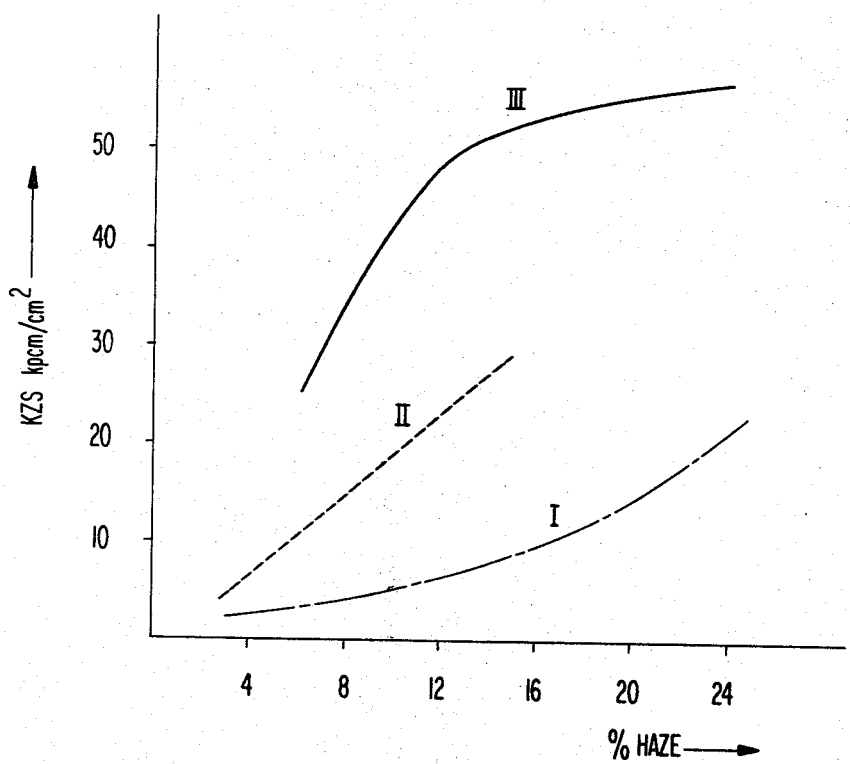

The acrylic ester component in the acrylic ester copolymer contains one acrylic ester or a plurality of different acrylic esters (e.g., two to four different acrylic esters). Examples of useful acrylic esters for forming the acrylic ester copolymer are propyl acrylate, isopropyl acrylate, butyl acrylate, isobutyl acrylate, hexyl acrylate, 2-ethyl hexyl acrylate, lauryl acrylate, myristyl acrylate, stearyl acrylate and mixtures thereof. Acrylic ester copolymers containing at least 90 percent by weight of 2-ethyl hexyl acrylate as acrylic ester component are preferably used.

The following compounds are examples of useful polyfunctional monomers having at least one allyl or allyl type double bond (which are used in the acrylic ester copolymers): monoallyl and methallyl esters of unsaturated mono or polycarboxylic acids, such as, allyl acrylate, allyl methacrylate, allyl crotonate, allyl cinnamate, methallyl acrylate, methallyl methacrylate, monoallyl maleate and monoallyl fumarate; di-, tri- and tetraallyl and methallyl esters of saturated or unsaturated polycarboxylic acids, of cyanuric acid and of phosphoric acid, such as, diallyl and dimethallyl oxalate, diallyl glutarate, diallyl adipate, diallyl phthalate, diallyl terephthalate, tetra-allyl pyromellithate, diallyl maleate, dimethallyl maleate, diallyl fumarate, diallyl isocyanurate, triallyl cyanurate and triallyl phosphate; and di- or polyallyl ethers of polyhydric alcohols and polyallyl acetals, such as, trimethylol propane diallyl ester, trimethylol propane diallyl ether monomethacrylate and tetra-allyl oxyethane.

The polyfunctional allyl monomers can be present initially, or can be added batch-wise or continuously during the reaction, for example, in the form of a mixture with the acrylic acid ester or acrylic acid esters. In another embodiment, the polyfunctional allyl monomers can be introduced after there has been an acrylic ester reaction of at least 60 percent and preferably of 80 percent.

The amount of acrylic ester copolymer(s) used is such that there are 4 to 20 percent by weight, preferably 5 to 10 percent by weight, of acrylic ester units in the end product (resultant vinyl chloride polymer). The quantity of acrylic ester copolymer used, within the limits according to this invention, depends on the nature of the acrylic ester, the polymerization temperature, the particle size of the acrylic ester copolymer, and the required properties of the end product. The transparency of the end product remains high (or the cloudiness remains low) throughout the range (according to this invention) of acrylic ester copolymer used. Generally, the end products having a low acrylic ester copolymer content have a moderate impact strength, high softening temperature and high stiffness (rigidity). If the acrylic ester copolymer content is increased, the impact strength generally increases and the stiffness decreases. One ordinarily skilled in the art will readily be able to select the combination of properties suitable for a particular application with a minimum of experiment.

The following applies to the production of the starting acrylic ester copolymers.

The acrylic ester copolymers used for the process according to this invention are employed in the form of aqueous dispersions. They can be produced by emulsion polymerization of the feed monomers in the presence of water-soluble initiators and emulsifiers. The means particle diameter of the acrylic ester copolymers forming (formed) is determined in the manner known per se by the emulsion polymerization conditions.

Acrylic ester copolymer dispersions of different mean particle diameters may be prepared, for example, by varying the amount of emulsifier used. The emulsifiers are primarily salts of fatty acids having a chain length of from 12 to 18 carbon atoms. Preferably, the alkali or ammonium salts of lauric acid, myristic acid, oleic acid, coconut oil acid, palmitic acid, stearic acid, etc., are used. These emulsifiers are advantageously used in quantities of from 2 to 12 percent by weight based on the monomeric acrylate.

The way in which the monomers and/or emulsifier is added provides another way of influencing the acrylic ester copolymer particle diameter. It is well known that, for example, coarser dispersions are obtained if only some of the total quantity of emulsifier is initially present, with the remainder being added during the reaction.

When acrylic ester copolymer dispersions with relatively coarse mean particle diameters are required, the copolymerization can be carried out in the presence of a pre-formed latex of an acrylic ester homopolymer or copolymer. In such case the polymerization conditions are so selected that only the initially present polymer particles continue to grow without new particles forming.

The mean particle diameter can be determined by different methods in principle, for example, light scatter measurements, by means of a disc centrifuge or by electron microscopy. The latter case entails the risk that the polymer particles will change so intensively during the production of the samples and/or measurements, due to agglomeration or fusion as a result of their low softening temperature, that reliable determination is no longer possible.

Soap titration has proved particularly suitable because of its simplicity. This method is well known and has been used by numerous authors (e.g., Houben-Weyl XIV/1, Page 369). It is based on determination of the specific particle area of the dispersion under examination. If d denotes the mean particle diameter in nm and E denotes the amount of emulsifier required in q in order to cover 1 gm. of polymer with a monomolecular emulsifier coating, and if the density of the polyacrylate or acrylic ester copolymer is taken as 1.00, then according to Jacobi, Angew. Chemie 64, 539-543 (1952) the equation:

$$d = \frac{9.4}{E}$$

applies to titration with Mersolat K 30.

The following applies to the production of the vinyl chloride polymer.

The polymerization of the vinyl chloride, either together with or without other copolymerizable monomers, is carried out in aqueous emulsion, preferably at temperatures of from 50° to 70° C. The copolymerizable monomers that can be used in addition to vinyl chloride are, in particular: $\alpha$-olefins, for example, ethylene propylene and 1-butylene; unsaturated carboxylic esters, mainly vinyl esters, such as, vinyl acetate, vinyl propionate, vinyl laurate vinyl stearate, etc., acrylic esters having 1 to 18 carbon atoms in the alkyl group, and maleic or fumaric diesters having 1 to 12 carbon atoms in the alkyl group; and unsaturated ethers, such as, alkyl vinyl ethers, for example, methyl, ethyl, butyl, isobutyl, lauryl, cetyl and stearyl vinyl ether, isopropenyl methyl ether and isopropenyl ethyl ether. The $\alpha$-olefins and the unsaturated carboxylic esters are preferably used in quantities of from 3 to 20 percent by weight, while the unsaturated ethers are preferably used in quantities of from 1 to 15 percent by weight.

The emulsifiers used will primarily be anion-active emulsifiers, for example, carboxylic acid salts, alkyl sulphates and alkyl or alkyl aryl sulphonates. Preferably, salts of fatty acids are used with a chain length of 12 to 18 carbon atoms, primarily the alkali or ammonium salts of lauric acid, myristic acid, oleic acid, coconut oil acid, palmitic acid, stearic, acid, et. These emulsifiers are advantageously used in quantities of from 0.05 to 1 percent based on the monomers.

The catalysts used are water-soluble radical forces, such as peroxides, persulphates, azo-compounds and redox compounds. The quantity is advantageously 0.05 to 0.5 percent by weight based on the monomers.

Polymerization can be carried out in the presence of polymerization controllers, such as, mercaptans and saturated or unsaturated halogen hydrocarbons. The amount of polymerization controller used depends upon its type and the required K-value. For example, dodecyl mercaptan is used in quantities of from 0.01 to 0.2 percent by weight based on the vinyl chloride. Trichloroethylene, 1,2-dichloroethylene or bromoform is used in a quantity of from 0.1 to 5 percent. Preferably, the K-value of the vinyl chloride polymers obtained are about 60 to 75.

The polymerization is carried out using a pressure vessel which allows thorough mixing, for example, a pressure vessel equipped with an agitator, the aqueous dispersion of the acrylic ester copolymer together with the catalyst, emulsifier and any polymerization controller being placed in the pressure vessel, the monomeric vinyl chloride being added (in doses or continuously) either with or without other copolymerizable monomers, and being polymerized at the given reaction temperature.

The process according to this invention can be carried out with a working pressure of 65 to 99 percent, preferably 75 to 99 percent, of the saturation pressure of the vinyl chloride or of the monomer mixture at the appropriate polymerization temperature. The monomeric vinyl chloride is partly dissolved in the aqueous phase and partly absorbed in the polymer that has already formed and is finally in the gaseous state; however, it is never present in the liquid state in the reaction chamber.

The working pressure can be maintained by continuous or substantially continuous supply of vinyl chloride as it is consumed by the polymerization process.

This replenishment of vinyl chloride may, for example, be effected by connecting the polymerization vessel gas chamber to the gas chamber of a reservoir in which monomeric vinyl chloride - if necessary, after the addition of a non-volatile polymerization inhibitor - is kept at a temperature such that the resulting pressure is just sufficient to equalize the specified working pressure in the reaction chamber. The vinyl chloride may alternatively be continuously pumped in liquid form; in a preferred embodiment of this invention, liquid vinyl chloride is introduced in batches so small that the pressure in the reaction chamber remains substantially constant, i.e., fluctuates in practice by less than 0.2 atmospheres about the specified value. As a result of the vacuum in the reaction chamber the liquid vinyl chloride added is immediately vaporized on arrival in the reaction chamber so that no vinyl chloride in liquid form can reach the polymerization centers.

The monomers copolymerizable with the vinyl chloride can be added either in the form of a mixture with the vinyl chloride or separately, in which latter case they may be initially present completely or else just partially and the remainder added continuously or intermittently during the polymerization process.

After polymerization is complete, the polymer is processed in a known manner, for example, by coagulation, with the addition of electrolytes, and separation from the polymerization serum by centrifuging, washing and drying in a rotary dryer, or by automization drying or by a spray drying or spraying on a drum dryer.

The polyvinyl chloride products obtained according to this invention have a higher impact strength and/or a better transparency than the corresponding products produced according to the prior-art involving polymerizing of the vinyl chloride in the presence of acrylic acid esters pre-polymers or pre-polymer of acrylic acid ester and α-methyl styrene.

Figure 2:
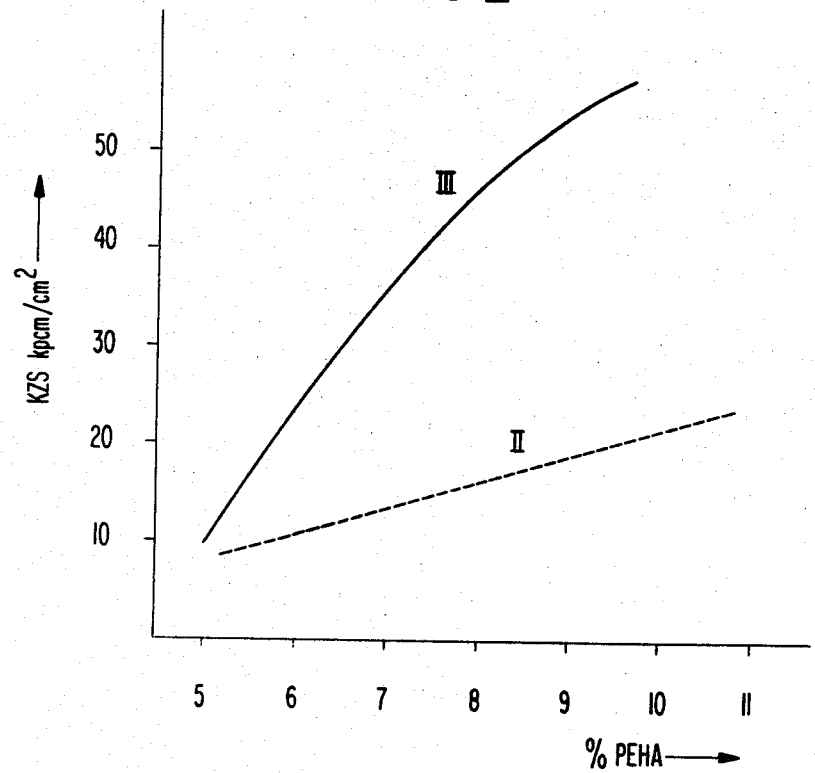

This is shown by the curves in FIGS. 1 and 2. (In FIG. 1, curve I uses poly-2-ethyl hexyl acrylate as the prepolymer, curve II uses a copolymer of 2-ethyl hexyl acrylate and α-methylstyrene as the prepolymer, and curve III uses a copolymer of 2-ethyl hexyl acrylate and allyl methacrylate as the prepolymer. In FIG. 2, curve II uses poly-2-ethylhexyl acrylate or a copolymer of 2-ethyl-hexyl acrylate and α-methyl styrene as prepolymer and curve III uses a copolymer of 2-ethylhexyl acrylate and allyl methacrylate as the prepolymer. In FIGS. 1 and 2, KSZ is notched impact strength.)

FIG. 1 shows the notched impact strength (KSZ) in kpcm/cm$^2$, against the haze of 1 mm pressed sheets in percent. Curve I corresponds to vinyl chloride polymers produced in the presence of 3 to 10 percent by weight of poly-2-ethyl hexyl acrylate with different particle sizes of between approximately 25 nm and approximately 140 nm. Curve II shows vinyl chloride polymers produced in the presence of acrylic ester copolymers consisting of one or more acrylic esters and α-methyl styrene having mean particle sizes of approximately 25 nm to approximately 140 nm. The vinyl chloride polymers obtained according to this invention are shown in curve III. In comparison with the products of curves I and II, the haze of the products of this invention is either reduced by about 50 percent with the same notched impact strength (along horizontal straight lines) or else the notched impact strengths are twice as great as the given haze (along vertical straight lines).

FIG. 2 shows the notched impact strength in kpcm/cm$^2$ as a function of the percentage of polyacrylic ester contained in the end product. Curve II corresponds to vinyl chloride polymer which was produced in the presence of 2-ethylhexyl acrylate polymers or copolymers of acrylic ester and α-methyl styrene. The vinyl chloride polymers obtained according to this invention are shown in curve III. For the same polyacrylic ester content, the product of this invention have a superior notched impact strength over the entire range. Since the stiffness depends primarily on the acrylic ester polymer content and decreases with the increases of the former. The vinyl chloride obtained according to this invention enable higher impact strength to be obtained with identical stiffness, or higher stiffness with identical impact strength.

In addition, the white-spot effect does not occur on breakage of the products according to this invention. This effect is characteristic of a panel or sheet made from a vinyl chloride polymer obtained by the conventional processes in the presence of an acrylic ester polymer, when subjected to mechanical stress such as bending pulling, permanent damage occurring at those places which were subjected to stress and having a disturbing appearance in the form of white spots. Sheets of the material according to the invention can be bent to and fro repeatedly, for example, through 180°, without any white spots occurring.

If the polyfunctional monomers having at least two non-conjugated ethylenic double bonds, at least one of which is of the allyl type, are replaced by polyfunctional monomers which do not have a double bond of the allyl type, for example, ethylene glycol dimethacrylate or 1,3-butylene glycol dimethacrylate, the required impact strength, transparency and white spot effect achieved with the process according to this invention is not attained.

As a result of their excellent impact strength, transparency and resistance to weather conditions, the vinyl chloride polymers according to this invention can be utilized in the manufacture of transparent or translucent products, such as, panels, pipes or cuves, sections, etc, by extrusion, injection molding, calendering etc, and provide valuable building materials.

In this application, all parts, percentages and ratios are on a weight basis, unless otherwise stated.

EXAMPLE 1

Preparation of acrylic ester copolymers (pre-dispersion)

Desalinated water, lauric acid (LS), caustic soda solution and potassium peroxide disulphate (KPS), in the quantities indicated in Table 1, were heated to the polymerization temperature of 70° C. with agitation in a 12-liter stainless steel agitator. After repeated evacuation and admission of nitrogen under pressure to flush the agitator, nitrogen was finally introduced under a pressure of 2 atmospheres gauge. After the polymerization temperature had been reached, 100 gm. of monomer or monomer mixture (pre-dispersions A to F, H, J and K) were pumped in for 2 minutes. The remaining monomer was pumped in over a period of 2 hours after 10 minutes. After a total reaction time of 4 hours, the pressure was determined by soap titration with emulsifier K 30 (Bayer).

The following examples illustrate the production of pre-dispersions A to F and of comparison pre-dispersions H, J and K according to Table 1.

Mixtures consisting of 60.5 parts by weight of vinyl chloride polymer, 1 part by weight of organic thiostannic stabilizer and 1 part by weight of lubricant were rolled for 10 minutes at 180° C. on mixing rolls and pressed at 180° C. to yield 1 mm and 4 mm thick sheets. The notched impact strength of small standard sticks was measured in accordance with DIN 53453 (German Industrial Standard) and the VICAT (VC) softening Table 1

| Preliminary Dispersion | Water, gm. | LS, gm. | NaOH 10N, ml. | KPS, gm. | EHA, gm. | MS, gm. | Polyfunctional Monomer | | Temperature °C. | Mean Particle Diameter, nm | Composition of the Copolymerizates, percentage | |
|---|---|---|---|---|---|---|---|---|---|---|---|---|
| | | | | | | | | gm. | | | EHA | Polyfunctional Monomer |
| A | 5,925 | 30 | 15 | 5 | 1,000 | — | AMA | 25 | 70° | 55 | 97.6 | 2.4 |
| B | 5,625 | 30 | 15 | 5 | 1,300 | — | AMA | 30 | 70° | 65 | 97.7 | 2.3 |
| C | 5,940 | 24 | 11 | 5 | 1,000 | — | AMA | 25 | 70° | 117 | 97.6 | 2.4 |
| D | 5,940 | 20 | 10 | 5 | 1,000 | — | AMA | 25 | 70° | 144 | 97.6 | 2.4 |
| E | 5,940 | 29 | 14.5 | 5 | 1,000 | — | AMA | 10 | 70° | 61 | 99.0 | 1.0 |
| F | 5,950 | 24 | 11 | 5 | 1,000 | — | AMA | 10 | 70° | 112 | 99.0 | 1.0 |
| H | 5,950 | 30 | 15 | 5 | 1,000 | — | — | — | 70° | 60 | 100.0 | 0.0 |
| J | 5,650 | 30 | 15 | 5 | 1,000 | 300 | — | — | 70° | 60 | 76.9 | 0.0 |
| K | 5,925 | 28 | 14 | 5 | 1,000 | — | AGDM | 25 | 70° | 71 | 97.6 | 2.4 |

Notes:
AGDM = ethylene glycol dimethacrylate
KPS = potassium peroxide disulfate
AMA = allymethacrylate
LS = lauric acid
EHA = 2-ethyl hexyl acrylate
MS = α-methyl styrene

EXAMPLE 2

Preparation of vinyl chloride polymers

Desalinated water, lauric acid, caustic soda solution and potassium peroxide disulphate in quantities as indicated in Table 2a were placed in a 12 liter agitator autoclave and heated to the polymerization temperature of 59° C. The appropriate dispersion of the copolymer (pre-dispersion) was introduced during the heating-up period (in the quantity shown in Table 2a). The autoclave was then evacuated and flushed by repeated admission of vinyl chloride under pressure followed by expansion. After the polymerization temperature had been reached, the indicated quantity of vinyl chloride was admitted under pressure. The reaction was allowed to progress with agitation to a pressure of 4 atmospheres gauge, and then the pressure was reduced and the vessel cooled. The dispersion contained 23 to 25 percent by weight of solids. The polymer was isolated conventionally by coagulation with electrolytes.

points were measured in accordance with DIN 53460. The haze (cloudiness) was measured by means of the Haze-meter of Evans Electroselenium Ltd. of Halstead (England), by the method of ASTM D 1003-61. Haze is defined as the ratio of the light Td, scattered on passing through the sample, to the total transmitted light Tt. The measurement is given as a percentage:

$$\text{Haze} = \frac{Td}{Tt} \cdot 100(\%)$$

To test processing properties, a mixture of 57 parts by weight of vinyl chloride polymer, 2.3 parts by weight of barium cadmium stabilizer and 0.7 parts by weight of lubricant were kneaded in a type 50 measuring kneader of a type P1 3 S plastograph made by Brabender, of Duisburg (Germany), at 180° C. and 40 rpm. The lowest torque reached in kpm after gelling was taken as the indication of the processing properties, said torque depending upon the melt viscosity of the material.

The results obtained are shown in Table 2(b).

Table 2(a)

| Experiment No. | Pre-dispersions | | | Water, gm | LS, gm | NaOH 1N ml | KPS, gm | VC, gm | Temperature, °C. |
|---|---|---|---|---|---|---|---|---|---|
| | No. | Particle Diameter, nm | gm | | | | | | |
| 1 | B | 65 | 430 | 5590 | 11 | 60 | 2 | 1920 | 59° |
| 2 | B | 65 | 560 | 5480 | 10 | 60 | 2 | 1900 | 59° |
| 3 | B | 65 | 700 | 5380 | 9 | 50 | 2 | 1870 | 59° |
| 4 | B | 65 | 910 | 5210 | 8 | 45 | 2 | 1830 | 59° |
| 5 | B | 65 | 1190 | 5000 | 7 | 40 | 2 | 1780 | 59° |

Notes:
KPS = Potassium peroxide disulfate
LS = lauric acid
VC = vinyl chloride

Table 2(b)

| Experiment No. | Content, percentage EHA | Content, percentage AMA | Cloudiness, percentage 1 mm plate | Cloudiness, percentage 4 mm plate | Brabender Torque, mkp | Impact Strength, kpcm/cm$^2$ | Vicat °C. |
|---|---|---|---|---|---|---|---|
| 1 | 4.9 | 0.11 | 9 | 30 | 2.45 | 8.5 | 76 |
| 2 | 5.9 | 0.14 | 9 | 26 | 2.25 | 34.0 | 76 |
| 3 | 7.1 | 0.16 | 13 | 38 | 2.4 | 51.5 | 77 |
| 4 | 9.3 | 0.21 | 12 | 31 | 2.4 | 52.0 | 76 |
| 5 | 12.5 | 0.29 | 19 | 45 | 2.5 | 52.9 | 76 |

Notes:
AMA = allylemethacrylate
EHA = 2-ethyl hexyl acrylate

EXAMPLE 3

The experiments of Example 2 were repeated, however pre-dispersions of variable particle sizes and/or of a lower allyl methacrylate content were used. The polymerization formulations and the results are given in Tables 3(a) and 3(b).

Table 3(a)

| Experiment No. | Pre-dispersions No. | Particle Diameter nm | gm | Water, gm | LS, gm | NaOH 1N ml | KPS, gm | VC, gm | Temperature, °C. |
|---|---|---|---|---|---|---|---|---|---|
| 6 | A | 55 | 910 | 5,230 | 8 | 45 | 2 | 1,870 | 59° |
| 3 | B | 65 | 700 | 5,380 | 9 | 50 | 2 | 1,870 | 59° |
| 7 | C | 117 | 910 | 5,210 | 8.8 | 45 | 2 | 1,870 | 59° |
| 8 | D | 144 | 910 | 5,210 | 8 | 45 | 2 | 1,870 | 59° |
| 9 | E | 61 | 910 | 5,210 | 8 | 45 | 2 | 1,870 | 59° |
| 10 | F | 112 | 910 | 5,210 | 8.8 | 45 | 2 | 1,870 | 59° |

Notes:
KPS = Potassium peroxide disulfate
LS = lauric acid
VC = vinyl chloride

Table 3(b)

| Experiment No. | Content, percentage EHA | Content, percentage AMA | Cloudiness, percentage 1 mm plate | Cloudiness, percentage 4 mm plate | Brabender Torque, mkp | Impact Strength, kpcm/cm$^2$ | Vicat °C. |
|---|---|---|---|---|---|---|---|
| 6 | 7.9 | 0.20 | 8 | 24 | 2.3 | 38.7 | 76 |
| 3 | 7.1 | 0.16 | 13 | 38 | 2.4 | 51.5 | 77 |
| 7 | 7.8 | 0.20 | 65 | 96 | 2.5 | 47.2 | 77 |
| 8 | 6.6 | 0.17 | 94 | 97 | 2.4 | 30.8 | 76 |
| 9 | 7.3 | 0.07 | 11 | 38 | 2.35 | 34.4 | 76 |
| 10 | 7.5 | 0.08 | 71 | 99 | 2.4 | 45.3 | 77 |

Notes:
AMA = allylmethacrylate
EHA = 2-ethyl hexyl acrylate

EXAMPLE 4

Experiment Nos. 3 and 9 (according to this invention) were repeated, however using a polymerization temperature of 52° C. and 66° C., respectively, instead of 59° C. or with the addition of about 1 percent by weight (based on the vinyl chloride) of trichloroethylene. The polymerization formulations and the results are given in Tables 4(a) and 4(b).

Table 4(a)

| Experiment No. | Predispersions No. | Particle Diameter, nm | gm | Water, gm | LS, gm | NaOH, 1N ml | KPS, gm | VC, gm | Tri, gm | Temperature, °C. |
|---|---|---|---|---|---|---|---|---|---|---|
| 3 | B | 65 | 700 | 5,380 | 9 | 50 | 2 | 1,870 | — | 59° |
| 11 | B | 65 | 700 | 5,380 | 9 | 50 | 2 | 1,870 | 18 | 59° |
| 12 | E | 61 | 910 | 5,210 | 8 | 45 | 2 | 1,870 | — | 52° |
| 9 | E | 61 | 910 | 5,210 | 8 | 45 | 2 | 1,870 | — | 59° |
| 13 | E | 61 | 910 | 5,210 | 8 | 45 | 2 | 1,870 | — | 66° |

Notes:
KPS = potassium peroxide disulfate
LS = lauric acid
Tri = trichloro ethylene
VC = vinyl chloride

Table 4(b)

| Experiment No. | Content, percentage | | Cloudiness, percentage | | Brabender Torque, mkp | Impact Strength, kpcm/cm² | Vicat, °C. |
|---|---|---|---|---|---|---|---|
| | EHA | AMA | 1 mm plate | 4 mm plate | | | |
| 3 | 7.1 | 0.16 | 13 | 38 | 2.4 | 51.5 | 77 |
| 11 | 8.6 | 0.20 | 14 | 47 | 2.0 | 39.5 | 74 |
| 12 | 7.1 | 0.07 | 11 | 33 | 2.85 | 42.8 | 78 |
| 9 | 7.3 | 0.07 | 11 | 38 | 2.35 | 34.4 | 76 |
| 13 | 6.8 | 0.07 | 16 | 46 | 1.95 | 19.6 | 75 |

Notes:
AMA = allylmethacrylate
EHA = 2-ethyl hexyl acrylate

EXAMPLE 5

As a comparison, vinyl chloride was polymerized according to the hitherto known processes in the presence of a dispersion of 2-ethylhexyl acrylate monopolymer (Experiments Nos. 52, 53, 54), or in the presence of a disperson of 2-ethylhexylacrylate-α-methyl styrene copolymerizates (Experiments Nos. 55, 56, 57, 58) or in the absence of dispersions of acrylic acid ester polymerizates (Experiment No. 51). Beyond that a copolymer of 2-ethylhexyl acrylate and ethylene glycol dimethacrylate, that is to say, of a poly-functional composition not according to this invention, was used as the acrylic acid ester polymer. Experiment Nos. 59 and 60). The polymerization formulations and the results are given in Tables 5(a) and (b). Very high impact strengths, or simultaneously low degrees of cloudiness and high impact strengths, were not achieved in any of these experiments as was the case when using copolymers from acrylic acid esters and poly-functional allyl compounds according to this invention.

TABLE 5(a)

| Experiment No. | Predispersions | | | Water, gm | Ls, gm | NaOH, 1N ml | KPS, gm | VC, gm | Temperature °C. |
|---|---|---|---|---|---|---|---|---|---|
| | No. | Particle Diameter, nm | gm | | | | | | |
| 51 | — | — | 0 | 5,940 | 12 | 60 | 2 | 2,000 | 59° |
| 52 | H | 60 | 560 | 5,470 | 9 | 50 | 2 | 1,900 | 59° |
| 53 | H | 60 | 700 | 5,450 | 9 | 50 | 2 | 1,900 | 59° |
| 54 | H | 60 | 910 | 5,170 | 8 | 45 | 2 | 1,870 | 59° |
| 55 | J | 60 | 560 | 5,480 | 10 | 60 | 2 | 1,900 | 59° |
| 56 | J | 60 | 700 | 5,380 | 9 | 50 | 2 | 1,870 | 59° |
| 57 | J | 60 | 910 | 5,210 | 8 | 45 | 2 | 1,830 | 59° |
| 58 | J | 60 | 1,190 | 5,000 | 7 | 40 | 2 | 1,780 | 59° |
| 59 | K | 71 | 910 | 5,210 | 8 | 45 | 2 | 1,870 | 59° |
| 60 | K | 71 | 1,190 | 5,000 | 7 | 40 | 2 | 1,780 | 59° |

Notes:
KPS = potassium peroxide disulfate
Ls = lauric acid
VC = vinyl chloride

TABLE 5(b)

| Experiment No. | Content, Percentage | | | | Cloudiness Percentage | | Brabender torque, mkp | Impact Strength, kpcm/cm² | Vicat, °C. |
|---|---|---|---|---|---|---|---|---|---|
| | EHA | MS | Polyfunctional Monomer | | 1 mm Plate | 4 mm Plate | | | |
| 51 | 0.0 | 0.0 | — | 0.0 | 3 | 4 | n.d. | 3.0 | 76 |
| 52 | 4.9 | 0.0 | — | 0.0 | 18 | n.d. | n.d. | 10.6 | 75 |
| 53 | 6.0 | 0.0 | — | 0.0 | 21 | n.d. | n.d. | 14.2 | 75 |
| 54 | 7.4 | 0.0 | — | 0.0 | 40 | n.d. | n.d. | 17.2 | 75 |
| 55 | 5.2 | 1.6 | — | 0.0 | 5 | 14 | 2.25 | 8.9 | 76 |
| 56 | 5.8 | 1.7 | — | 0.0 | 6 | 14 | 2.3 | 11.2 | 75 |
| 57 | 7.7 | 2.3 | — | 0.0 | 9 | 25 | 2.3 | 12.5 | 76 |
| 58 | 9.8 | 3.0 | — | 0.0 | 12 | 31 | 2.3 | 23.4 | 75 |
| 59 | 6.4 | 0.0 | AGDM | 0.16 | 21 | 66 | 2.2 | 31.7 | 77 |
| 60 | 9.5 | 0.0 | AGDM | 0.24 | 39 | 88 | 2.3 | 30.8 | 76 |

Notes:
AGDM = ethylene glycol dimethacrylate
EHA = 2-ethyl hexyl acrylate
Ms = -methyl styrene
n.d. = not determined

EXAMPLE 6

Pre-dispersions of copolymers from 2-ethyl hexylacrylate and different polyfunctional allyl monomers were prepared using the method described in Example 1. The formulation and properties of pre-dispersions L to N are set out in Table 6.

Using the method of Example 2, vinyl chloride was polymerized at 59° C. in the presence of different amounts of the above mentioned pre-dispersions. The polymerization conditions and the results are set out in Tables 7(a) and 7(b).

TABLE 6

| Pre-dispersion | Water, gm. | LS, gm. | NaOH, 1N, ml. | KPS, gm. | EHA, gm. | Polyfunctional monomer Art | Polyfunctional monomer gm. | Temperature °C. | Medium Particle Diameter, nm. | Composition of the prepolymer % EHA | Composition of the prepolymer % polyfunctional monomer |
|---|---|---|---|---|---|---|---|---|---|---|---|
| L | 5,810 | 28 | 135 | 5 | 1,000 | TAC | 25 | 70° | 74 | 97.6 | 2.4 |
| M | 5,810 | 28 | 135 | 5 | 1,000 | DAP | 25 | 70° | 78 | 97.6 | 2.4 |
| N | 5,810 | 28 | 135 | 5 | 1,000 | DAF | 25 | 70° | 78 | 97.6 | 2.4 |

Notes:
DAF = diallyl fumarate
DAP = diallylphthalate
EHA = 2-ethyl hexylacrylate
KPS = potassium peroxide disulfate
LS = lauric acid
TAC = triallyl cyanurate

TABLE 7(a)

| Experiment No. | Pre-dispersion No. | Pre-dispersion Particle diameter, nm | Pre-dispersion gm. | Water, gm. | LS, gm | NaOH 1N, ml. | KPS, gm. | VC, gm. | Temperature, °C. |
|---|---|---|---|---|---|---|---|---|---|
| 14 | L | 74 | 1,260 | 4,900 | 7 | 40 | 2 | 1,820 | 59° |
| 15 | L | 74 | 2,100 | 4,200 | 4 | 25 | 2 | 1,700 | 59° |
| 16 | M | 78 | 910 | 5,190 | 8 | 45 | 2 | 1,870 | 59° |
| 17 | M | 78 | 1,260 | 4,900 | 7 | 40 | 2 | 1,820 | 59° |
| 18 | N | 78 | 1,260 | 4,900 | 7 | 40 | 2 | 1,820 | 59° |
| 19 | N | 78 | 2,100 | 4,200 | 4 | 25 | 2 | 1,700 | 59° |

Notes:
KPS = potassium peroxide disulfate
LS = lauric acid

TABLE 7(b)

| Experiment No. | Content, Percentage EHA | Content, Percentage TAC | Content, Percentage DAP | Content, Percentage DAF | Haze, percentage 1 mm Plate | Haze, percentage 4 mm Plate | Brabender Torque, mkp | Impact Strength kpcm/cm$^2$ | Vicat, °C. |
|---|---|---|---|---|---|---|---|---|---|
| 14 | 10.0 | 0.25 | — | — | 23 | 60 | 2.45 | 47.2 | 76° |
| 15 | 16.0 | 0.40 | — | — | 24 | 59 | 2.50 | 44.8 | 76° |
| 16 | 7.9 | — | 0.20 | — | 21 | 57 | 2.40 | 35.6 | 76° |
| 17 | 10.3 | — | 0.26 | — | 25 | 59 | 2.45 | 43.8 | 76° |
| 18 | 10.4 | — | — | 0.26 | 26 | 68 | 2.45 | 47.5 | 77° |
| 19 | 16.4 | — | — | 0.41 | 25 | 60 | 2.50 | 43.1 | 76° |

Notes:
DAF = diallyl fumarate
DAP = diallyl phthalate
TAC = triallyl cyanurate
EHA = 2-ethyl hexylacrylate

What is claimed is:

1. The process for the preparation of a transparent, weather-resistant vinyl chloride polymer having a very high impact strength by the polymerization of vinyl chloride either together with or without other copolymerizable monomers in aqueous dispersion by the emulsion polymerization method in the presence of at least one acrylic acid ester copolymer which consists essentially of emulsion polymerizing vinyl chloride or a monomer mixture containing at least 80 percent by weight of vinyl chloride in the presence of a dispersion of at least one acrylic acid copolymer containing of 90 to 99.7 percent by weight of units of at least one acrylic acid ester and 0.3 to 10 percent by weight of units of a polyfunctional monomer, said acrylic acid ester copolymer having a mean particle diameter of 30 to 150 nm, determined by soap titration, said acrylic acid ester copolymer being used in a quantity such that the resultant vinyl polymer contains 4 to 20 percent by weight of acrylic acid ester units, said acrylic acid ester being selected from the group consisting of propyl acrylate, isopropyl acrylate, butyl acrylate, isobutyl acrylate, hexyl acrylate, 2-ethyl hexyl acrylate, lauryl acrylate, myristyl acrylate and stearyl acrylate, and said polyfunctional monomer being selected from the group consisting of allyl acrylate, allyl methacrylate, allyl crotonate, allyl cinnamate, methallyl acrylate, methallyl methacrylate, monoallyl maleate, monoallyl fumarate, diallyl oxalate, dimethallyl oxalate, diallyl glutarate, diallyl adipate, diallyl phthalate, diallyl terephthalate, tetra-allyl pyromellitate, diallyl maleate, dimethallyl maleate, diallyl fumarate, diallyl isocyanurate, triallyl cyanurate, triallyl phosphate, trimethylol propane diallyl ester, trimethylol propane diallyl ether monomethacrylate and tetra-allyl oxyethane.

2. The process for the preparation of a transparent, weather-resistant vinyl chloride graft polymer having a very high impact strength by the polymerization of vinyl chloride either together with or without other copolymerizable monomers in aqueous dispersion by the emulsion polymerization method in the presence of at least one acrylic acid ester copolymer which comprises emulsion polymerizing vinyl chloride or a monomer mixture containing at least 80 percent by weight of vinyl chloride in the presence of a dispersion of at least one acrylic acid ester copolymer consisting of 90 to 99.7 percent by weight of units of at least one acrylic acid ester and 0.3 to 10 percent by weight of units of polyfunctional allyl monomer selected from the group consisting of allyl methacrylate, triallyl cyanurate, diallyl phthalate and diallyl fumatate, said acrylic acid ester copolymer having a mean particle diameter of 30 to 150 nm, determined by soap titration, said acrylic acid ester copolymer being used in a quantity such that the resultant vinyl polymer contains 4 to 20 percent by weight of acrylic acid ester units, and said acrylic acid ester being selected from the group consisting of propyl acrylate, isopropyl acrylate, butyl acrylate, isobutyl acrylate, hexyl acrylate, 2-ethyl hexyl acrylate, lauryl acrylate, myristyl acrylate and stearyl acrylate.

3. The process as claimed in claim 2 wherein said copolymer has a mean particle diameter of 40 to 120 nm.

4. The process as claimed in claim 2 wherein said acrylic acid ester copolymer is used in a quantity such that the resultant polymer contains 5 to 10 percent by weight of acrylic acid ester units.

5. The process as claimed in claim 2 wherein said acrylic acid ester copolymer consists of 95 to 99.5 percent by weight of at least one acrylic acid ester and 0.5 to 5 percent by weight of a polyfunctional monomer.

6. The process as claimed in claim 2 wherein said acrylic acid ester copolymer consists of two different acrylic acid esters and said polyfunctional allyl monomer.

7. The process as claimed in claim 2, wherein in said acrylic acid ester copolymer, the acrylic acid ester component contains at least 90 percent by weight of 2-ethyl hexyl acrylate.

8. The process as claimed in claim 2 wherein said polyfinctional allyl monomer is allyl methacrylate.

9. The process as claimed in claim 2 wherein said polyfunctional allyl monomer is tri-allyl cyanurate.

10. The proces as claimed in claim 2 wherein said emulsion polymerization of the vinyl chloride or the monomer mixture is carried out at temperature from 50° to 70° C.

11. The process as claimed in claim 2 wherein said polymerization is carried out in the presence of at least one salt of a fatty acid having 12 to 18 carbon atoms in the molecule as an emulsifier in a quantity of from 0.05 to 1 percent by weight based on the vinyl chloride.

12. The process as claimed in claim 2 wherein said polymerization is carried out in the presence of at least one chain transfer agent.

13. The process as claimed in claim 2 wherein said polymerization is carried out in the presence of mercaptans as a chain transfer agent, in the quantity of from 0.01 to 0.2 percent by weight based on the vinyl chloride.

14. The process as claimed in claim 2 wherein said polymerization is carried out in the presence of at least one saturated and/or unsaturated halogen hydrocarbon, as a chain transfer agent in th quantity of from 0.1 to 5 percent by weight based on the vinyl chloride.

15. The process as claimed in claim 2 wherein at least one water-soluble radical-former is used as a catalyst.

16. The process as claimed in claim 2 wherein said polymerization is carried out at an absolute pressure equal to 65 to 99 percent of the saturation pressure of the vinyl chloride or of the monomer mixture at the appropriate polymerization temperature and under emulsion polymerization conditions.

17. The process as claimed in claim 1 wherein said resultant vinyl polymer is separated from the emulsion/dispersion.

18. The process as claimed in claim 2 wherein said resultant vinyl polymer is separated from the emulsion/dispersion.

* * * * *